(12) United States Patent
Shimizu et al.

(10) Patent No.: US 11,208,946 B2
(45) Date of Patent: Dec. 28, 2021

(54) ENGINE CONTROL DEVICE AND ENGINE CONTROL METHOD

(71) Applicant: Mazda Motor Corporation, Hiroshima (JP)

(72) Inventors: Kouichi Shimizu, Aki-gun (JP); Tsukasa Hoshino, Aki-gun (JP); Ken Yoshida, Aki-gun (JP); Hirofumi Shinohara, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 16/764,527

(22) PCT Filed: Oct. 12, 2018

(86) PCT No.: PCT/JP2018/038189
§ 371 (c)(1),
(2) Date: May 15, 2020

(87) PCT Pub. No.: WO2019/097920
PCT Pub. Date: May 23, 2019

(65) Prior Publication Data
US 2020/0370468 A1  Nov. 26, 2020

(30) Foreign Application Priority Data

Nov. 17, 2017 (JP) .............................. JP2017-221448

(51) Int. Cl.
*F02B 37/16* (2006.01)
*F02B 39/04* (2006.01)
(Continued)

(52) U.S. Cl.
CPC ............ *F02B 37/162* (2019.05); *F02B 39/04* (2013.01); *F02D 23/005* (2013.01); *F02M 26/03* (2016.02); *F02M 26/50* (2016.02)

(58) Field of Classification Search
CPC ....... F02B 37/162; F02B 39/04; F02M 26/03; F02M 26/50; F02D 23/005
(Continued)

(56) References Cited

U.S. PATENT DOCUMENTS 8,056,338 B2 * 11/2011 Joergl .................... F02M 26/09
60/605.2
8,371,119 B2 * 2/2013 Durand ............... F02B 29/0468
60/599
(Continued)

FOREIGN PATENT DOCUMENTS

JP  H6221228 A  8/1994
JP  H7332166 A  12/1995
(Continued)

*Primary Examiner* — Thai Ba Trieu
(74) *Attorney, Agent, or Firm* — Alleman Hall Creasman & Tuttle LLP

(57) ABSTRACT

A determination is made whether or not the condition that the amount V of condensed water remaining in an intake passage has exceeded a predetermined upper limit has been met, based on an input parameter associated with the amount V. If, during an engine operation in an unsupercharged mode, a determination is made that the condition has been met, a condensed water discharging operation of a supercharger is performed such that the condensed water remaining is discharged to a cylinder of the engine through operation of the supercharger.

11 Claims, 8 Drawing Sheets

(51) Int. Cl.
*F02M 26/03* (2016.01)
*F02M 26/50* (2016.01)
*F02D 23/00* (2006.01)

(58) Field of Classification Search
USPC ............ 60/611, 605.1, 605.2; 701/104, 108; 123/559.1–559.3
See application file for complete search history.

(56) References Cited

U.S. PATENT DOCUMENTS

| | | | |
|---|---|---|---|
| 9,422,855 B2* | 8/2016 | Basile | F02B 29/0468 |
| 9,995,205 B2* | 6/2018 | Park | F02B 29/0468 |
| 2011/0011084 A1* | 1/2011 | Yanagida | F02M 26/06 |
| | | | 60/605.2 |
| 2011/0094219 A1 | 4/2011 | Palm | |
| 2011/0232598 A1* | 9/2011 | Harada | F02M 35/10222 |
| | | | 123/184.47 |
| 2014/0299112 A1* | 10/2014 | Quix | F02B 29/0443 |
| | | | 123/559.1 |
| 2014/0305122 A1* | 10/2014 | Springer | F02B 29/0425 |
| | | | 60/599 |
| 2015/0027114 A1 | 1/2015 | Ino | |
| 2015/0075162 A1* | 3/2015 | Yoshioka | F02M 26/50 |
| | | | 60/605.2 |
| 2016/0069302 A1* | 3/2016 | Tabata | F02M 26/06 |
| | | | 415/115 |
| 2016/0153347 A1* | 6/2016 | Morie | F02B 29/0418 |
| | | | 123/542 |
| 2016/0186701 A1* | 6/2016 | Ariizumi | F02B 37/16 |
| | | | 60/280 |
| 2016/0281652 A1 | 9/2016 | Takasu | |
| 2017/0167449 A1* | 6/2017 | Choi | F02M 26/50 |
| 2017/0306898 A1* | 10/2017 | Kim | F02M 26/05 |
| 2018/0202349 A1* | 7/2018 | Kindl | F02B 29/0468 |
| 2020/0003104 A1* | 1/2020 | Kitabatake | F02B 39/04 |
| 2020/0025158 A1* | 1/2020 | Nakahira | F02B 39/04 |
| 2020/0040854 A1* | 2/2020 | Hirata | F02M 26/03 |
| 2020/0095923 A1* | 3/2020 | Hasegawa | F02B 39/04 |
| 2020/0182134 A1* | 6/2020 | Yoshida | F02B 29/0443 |
| 2020/0318583 A1* | 10/2020 | Li | F02B 29/0468 |
| 2020/0370467 A1* | 11/2020 | Yoshida | F02B 37/16 |

FOREIGN PATENT DOCUMENTS

| | | |
|---|---|---|
| JP | H8291773 A | 11/1996 |
| JP | H8312475 A | 11/1996 |
| JP | 2004108212 A | 4/2004 |
| JP | 2007303475 A | 11/2007 |
| JP | 201474356 A | 4/2014 |
| JP | 2015121106 A | 7/2015 |
| JP | 5862620 B2 | 2/2016 |
| JP | 2016151252 A | 8/2016 |
| JP | 201775555 A | 4/2017 |
| JP | 2017-160840 A | 9/2017 |
| WO | 03001039 A1 | 1/2003 |

\* cited by examiner

TO MUFFLER

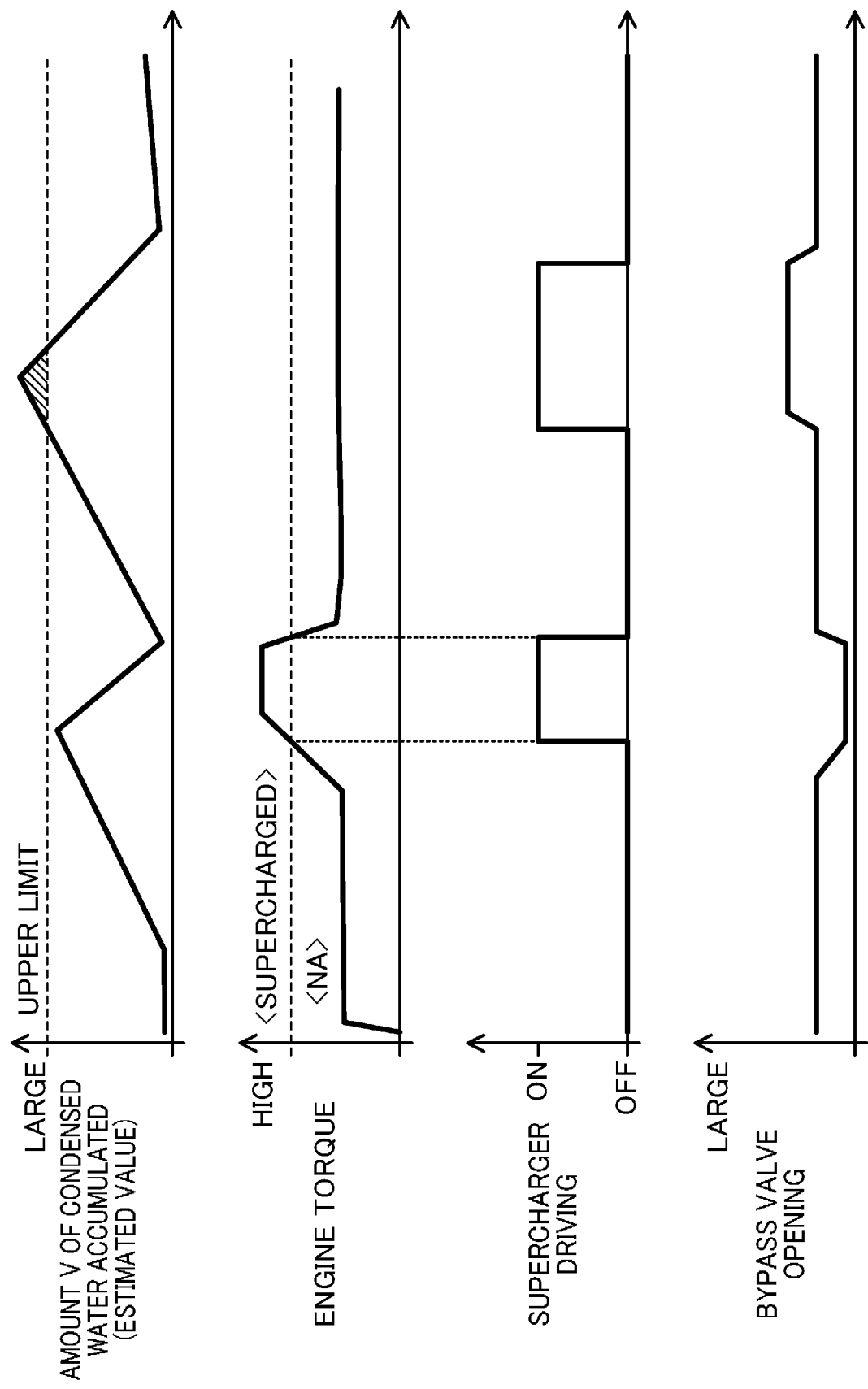

ENGINE CONTROL DEVICE AND ENGINE CONTROL METHOD

TECHNICAL FIELD

The present invention relates to a device and a method for controlling an engine with a supercharger.

BACKGROUND ART

Patent Document 1 shows the following: If, after an engine with an electric supercharger is stopped, the fuel vapor concentration in an intake system exceeds a predetermined threshold value, the electric supercharger is driven to scavenge the fuel vapor from the intake system.

CITATION LIST

Patent Document

Patent Document 1: Japanese Unexamined Patent Publication No. 2004-108212

SUMMARY OF THE INVENTION

Technical Problem

Condensed water generated by cooling moisture in intake air may be accumulated in a portion of an intake passage of an engine.

This situation will now be described. An engine with a supercharger generally includes an intercooler that cools intake air pressurized by the supercharger. If the intake air is cooled by the intercooler, moisture is condensed to form condensed water. In the case of an engine having an EGR device recirculating a portion of exhaust gas as EGR gas to an intake passage, the EGR gas is supplied to a portion of the intake passage downstream of a throttle valve to be cooled, and moisture in the EGR gas is condensed to form condensed water.

The condensed water accumulated in the intake passage of the engine causes corrosion of metal components forming the intake passage. The EGR gas contains a sulfur component or a similar component. This tends to cause corrosion of, in particular, the metal components. Further, a large amount of condensed water accumulated in the intake passage may cause cylinders to suck the large amount of condensed water at once during engine start-up, for example. This may cause water hammer to damage the engine.

It is therefore an object of the present invention to reduce the risk of accumulation of a large amount of condensed water in an intake passage of an engine, and to increase the durability of the engine.

Solution to the Problem

To achieve the object, the present invention allows condensed water accumulated in an intake passage to be discharged through a condensed water discharging operation of a supercharger.

A control device for an engine according to an aspect of the present disclosure includes: a supercharger provided in an intake passage of the engine; and a supercharger driver configured to drive the supercharger. The supercharger driver makes the supercharger supercharge the engine while the engine operates in a predetermined supercharged mode. The control device further includes: a determiner configured to determine whether or not a condition that an amount of condensed water remaining in the intake passage has exceeded a predetermined upper limit has been met, based on an input parameter associated with the amount; and a controller configured to, if, during an operation of the engine in an unsupercharged mode, the determiner determines that the condition has been met, make the supercharger driver perform a condensed water discharging operation to drive the supercharger, such that the condensed water remaining is discharged to a cylinder of the engine through operation of the supercharger.

In the engine control device, while the engine operates in the supercharged mode, the condensed water produced in the intake passage is discharged to the cylinder together with the intake air through the driving of the supercharger. On the other hand, while the engine operates in the unsupercharged mode, the supercharger is not driven. Thus, condensed water is accumulated in the intake passage. However, if the amount of condensed water remaining in the intake passage exceeds a predetermined upper limit, the condensed water discharging operation of the supercharger is performed even during the engine operation in the unsupercharged mode. Thus, the condensed water in the intake passage is discharged to the cylinder. This can reduce the risk that the amount of condensed water accumulated therein may exceed the predetermined upper limit. This can reduce the risk that metal components forming the intake passage may corrode and can further reduce the risk that water hammer may cause damage to the engine.

In one embodiment, the intake passage includes a bypass passage, the bypass passage being configured to bypass the supercharger and connecting a portion of the intake passage upstream of the supercharger and a portion of the intake passage downstream of the supercharger together, the bypass passage includes a bypass valve capable of changing a cross-sectional area of the bypass passage, and the controller controls an operation of the bypass valve such that during the condensed water discharging operation of the supercharger, the cross-sectional area of the bypass passage is larger than while the condensed water discharging operation is not performed.

According to this embodiment, if the condensed water discharging operation of the supercharger is performed during the engine operation in the unsupercharged mode, the cross-sectional area of the bypass passage increases. Thus, although the condensed water discharging operation of the supercharger increases the amount of intake air to be supplied downstream of the supercharger, the amount of intake air returned upstream of the supercharger through the bypass passage increases. This can reduce the risk that the amount of intake air flowing into the cylinder by the condensed water discharging operation of the supercharger may increase excessively.

In one embodiment, the supercharger is a mechanical supercharger rotationally driven by an output shaft of the engine serving as the supercharger driver, and as an engine speed during the condensed water discharging operation of the supercharger increases, the controller shortens a period during which the condensed water discharging operation is performed.

If the supercharger is rotationally driven by the output shaft of the engine, the condensed water discharge capacity of the supercharger increases as the engine speed increases. This reduces the condensed water earlier. In other words, the time required to reduce the amount of condensed water remaining is shortened. Thus, as the engine speed increases, the period during which the supercharger performs the condensed water discharging operation is shortened. This reduces the degree to which the accessory drive resistance of the engine increases in response to driving of the supercharger, and in turn, the degree to which the engine fuel consumption increases.

A control device for an engine according to another aspect of the present disclosure includes:

a supercharger provided in an intake passage of the engine;

a supercharger driver configured to drive the supercharger;

an intercooler configured to cool intake air discharged from the supercharger; and an EGR gas introduction portion configured to recirculate a portion of exhaust gas from the engine, as an EGR gas, to the intake passage.

The intake passage includes a bypass passage, the bypass passage being configured to bypass the supercharger and connecting a portion of the intake passage upstream of the supercharger and a portion of the intake passage downstream of the supercharger together.

The supercharger driver makes the supercharger supercharge the engine while the engine operates in a predetermined supercharged mode.

The bypass passage branches upward from the portion of the intake passage upstream of the supercharger, and extends above the supercharger.

The EGR gas introduction portion is provided as a portion of the bypass passage branching upward from the portion and extending above the supercharger.

The intercooler is located below the supercharger.

The device further includes: determiner configured to determine whether or not a condition that an amount of condensed water remaining in the intake passage has exceeded a predetermined upper limit has been met, based on an input parameter associated with the amount; and controller configured to, if, during an operation of the engine in an unsupercharged mode, the determiner determines that the condition has been met, make the supercharger driver perform a condensed water discharging operation to drive the supercharger, such that the condensed water remaining is discharged to a cylinder of the engine through operation of the supercharger.

According to this configuration, a portion of the bypass passage extending above the supercharger is provided with the EGR gas introduction portion. Thus, condensed water produced by introducing EGR gas into the bypass passage flows down through the portion of the bypass passage branching upward from the portion of the intake passage upstream of the supercharger, and tends to be accumulated in the portion of the intake passage upstream of the supercharger. Further, since the intercooler is located below the supercharger, condensed water produced when the intake air is cooled by the intercooler tends to be accumulated in a lower portion of the intercooler.

Then, if the amount of condensed water remaining in the intake passage exceeds a predetermined upper limit, the condensed water discharging operation of the supercharger is performed even during the engine operation in the unsupercharged mode. Thus, condensed water accumulated in the portion of the intake passage upstream of the supercharger is sucked into the supercharger and sent to the cylinder. An increase in the pressure of the intake air discharged from the supercharger allows condensed water accumulated in the lower portion of the intercooler to be also sent to the cylinder together with the intake air. This can reduce the risk that the amount of condensed water accumulated in the intake passage may exceed the predetermined upper limit. This can reduce the risk that metal components forming the intake passage may corrode, and can further reduce the risk that water hammer may cause damage to the engine.

A control method for an engine according to still another aspect of the present disclosure is a control method for an engine including a supercharger provided in an intake passage of the engine, and a supercharger driver configured to drive the supercharger, the supercharger driver driving the supercharger while the engine operates in a predetermined supercharged mode. The control method includes: determining whether or not a condition that an amount of condensed water remaining in the intake passage has exceeded a predetermined upper limit has been met, based on an input parameter associated with the amount; and if, during an operation of the engine in an unsupercharged mode, a determination is made that the condition has been met, performing a condensed water discharging operation of the supercharger through the supercharger driver, such that the condensed water remaining is discharged to a cylinder of the engine through operation of the supercharger.

Thus, if the amount of condensed water remaining in the intake passage exceeds a predetermined upper limit, the condensed water discharging operation of the supercharger is performed, and the condensed water is discharged to the cylinder, even during the engine operation in the unsupercharged mode. This can reduce the risk that the amount of condensed water accumulated may exceed the predetermined upper limit. This can reduce the risk that metal components forming the intake passage may corrode, and can further reduce the risk that water hammer may cause damage to the engine.

In one embodiment, the intake passage includes a bypass passage, the bypass passage being configured to bypass the supercharger and connecting a portion of the intake passage upstream of the supercharger and a portion of the intake passage downstream of the supercharger together.

The bypass passage includes a bypass valve capable of changing a cross-sectional area of the bypass passage.

In the performing of the condensed water discharging operation, the bypass valve allows the cross-sectional area of the bypass passage to be larger than while the condensed water discharging operation of the supercharger is not performed.

According to this configuration, if the condensed water discharging operation of the supercharger is performed during the engine operation in the unsupercharged mode, the cross-sectional area of the bypass passage increases. Thus, although the condensed water discharging operation of the supercharger increases the amount of intake air to be supplied downstream of the supercharger, the amount of intake air returned upstream of the supercharger through the bypass passage increases. This can reduce the risk that the amount of intake air flowing into the cylinder may increase.

In one embodiment, the supercharger is a mechanical supercharger driven by the engine serving as the supercharger driver.

In the performing of the condensed water discharging operation, as an engine speed during the condensed water discharging operation of the supercharger increases, a period during which the condensed water discharging operation is performed is shortened.

If the supercharger is rotationally driven by the output shaft of the engine, the condensed water discharge capacity of the supercharger increases as the engine speed increases.

This reduces the condensed water earlier. Thus, as the engine speed increases, the period during which the supercharger performs the condensed water discharging operation is shortened. This reduces the degree to which the accessory drive resistance of the engine increases in response to driving of the supercharger, and in turn, the degree to which the engine fuel consumption increases.

Advantages of the Invention

According to the present invention, if the amount of condensed water remaining in the intake passage exceeds a predetermined upper limit, the condensed water discharging operation of the supercharger is performed, and the condensed water is thus discharged to the cylinder, even during the engine operation in the unsupercharged mode. This can reduce the risk that metal components forming the intake passage may corrode, and can further reduce the risk that water hammer may cause damage to the engine.

BRIEF DESCRIPTION OF THE DRAWINGS

FIG. 8 is a timing diagram of the amount of condensed water remaining.

DESCRIPTION OF EMBODIMENTS

Embodiments of the present invention will now be described with reference to the drawings. The following description of preferred embodiments is only an example in nature, and is not intended to limit the scope, applications or use of the present invention.

<Intake and Exhaust System of Engine>

Figure 1:
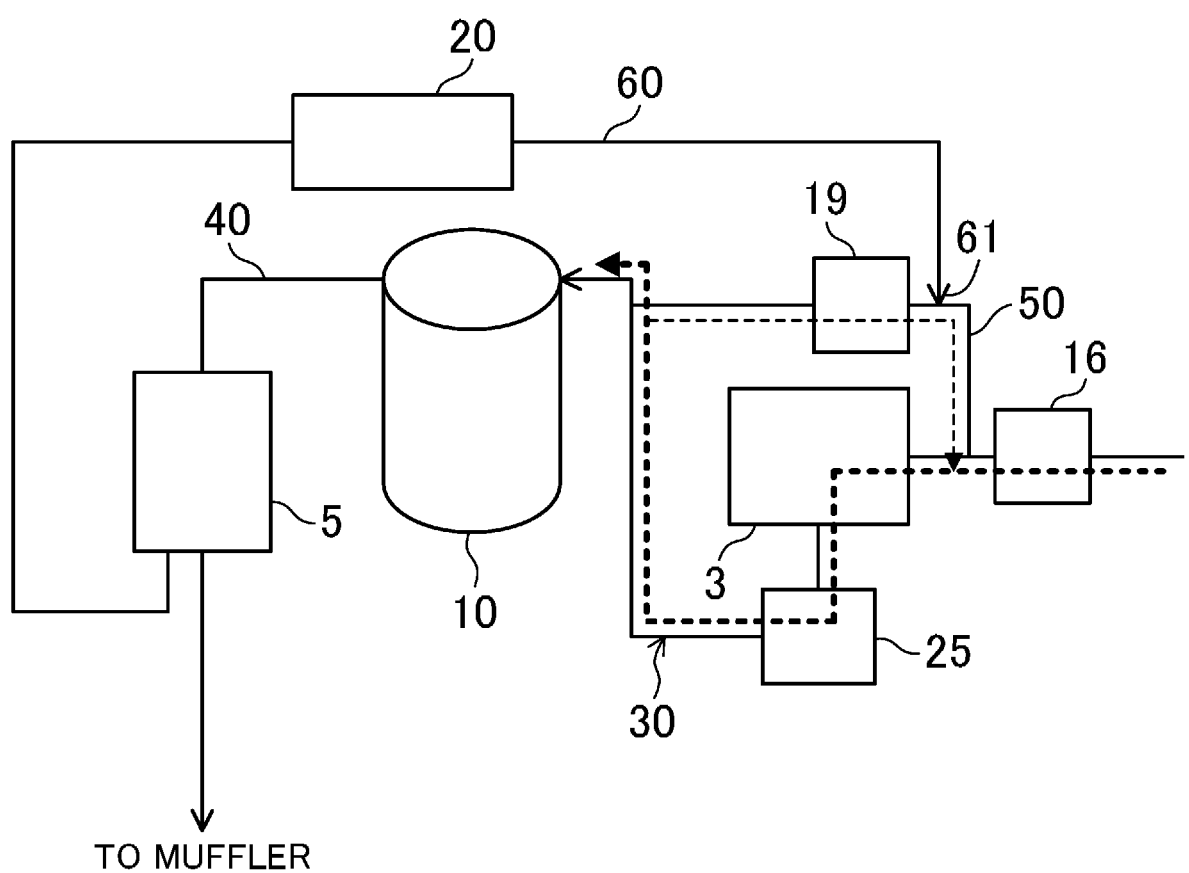
FIG. 1 is a block diagram showing an intake and exhaust system of an engine with a supercharger.

In an intake and exhaust system of an engine shown in FIG. 1, the reference character 10 denotes a cylinder forming a combustion chamber of the engine, the reference character 30 denotes an intake passage through which intake air is introduced into the cylinder 10, and the reference character 40 denotes an exhaust passage through which exhaust air is released from the cylinder 10. The engine is an in-line multi-cylinder engine with a supercharger for a motor vehicle. FIG. 1 shows only the one cylinder 10.

A throttle valve 16, a supercharger 3, and an intercooler 25 are arranged in this order from the upstream end to the downstream end of the intake passage 30. The throttle valve 16 adjusts the amount of intake air. The supercharger 3 compresses the intake air to supply the compressed intake air to the cylinder 10. The intercooler 25 cools the intake air discharged from the supercharger 3. The intake passage 30 includes a bypass passage 50 bypassing the supercharger 3 and connecting a portion of the intake passage upstream of the supercharger 3 and a portion of the intake passage downstream of the supercharger 3 together. The bypass passage 50 includes a bypass valve 19 capable of changing the cross-sectional area of the bypass passage 50.

While the engine operates in a predetermined supercharged mode, the supercharger 3 is driven by a supercharger driver S. While the engine operates in an unsupercharged mode, driving of the supercharger 3 is stopped.

An exhaust gas purifier 5 is arranged on the exhaust passage 40 to purify exhaust gas. An EGR passage 60 extends from a portion of the exhaust passage 40 downstream of the exhaust gas purifier 5, and recirculates a portion of exhaust gas as EGR gas to the intake passage 30. The EGR passage 60 is connected to a portion of the bypass passage 50 upstream of the bypass valve 19.

As will be described in detail below, in this embodiment, the bypass passage 50 branches upward from the portion of the intake passage upstream of the supercharger 3, and extends above the supercharger 3. A portion of the bypass passage 50 extending above the supercharger 3 is provided with an EGR gas introduction portion 61 of the EGR passage 60 through which EGR gas is introduced into the intake passage 30. The intercooler 25 is disposed below the supercharger 3.

The passages of the intake and exhaust systems are configured such that condensed water produced by introducing EGR gas into the bypass passage 50 flows down through the portion of the bypass passage 50 branching upward, and tends to be accumulated in the portion of the intake passage 30 upstream of the supercharger 3. Further, condensed water produced by cooling the intake air with the intercooler 25 tends to be accumulated in a lower portion of the intercooler 25.

In this embodiment, if the amount of condensed water remaining in the intake passage 30 exceeds a predetermined upper limit, the supercharger driver S makes the supercharger 3 perform a condensed water discharging operation such that the condensed water remaining is discharged to the cylinder of the engine through operation of the supercharger 3 even during the engine operation in the unsupercharged mode. Thus, as indicated by the bold broken line shown in FIG. 1, intake air is compressed by the supercharger 3, and is supplied to the cylinder 10 through the intercooler 25. As a result, the condensed water in the intake passage 30 is discharged to the cylinder 10. During the condensed water discharging operation of the supercharger 3, the bypass valve 19 increases the cross-sectional area of the bypass passage 50. This increases the amount of intake air to be returned to the upstream side of the supercharger 3 through the bypass passage 50. This can reduce the risk that the amount of intake air flowing into the cylinder 10 may increase excessively.

<Specific Configurations of Intake and Exhaust Systems of Engine>

Figure 2:
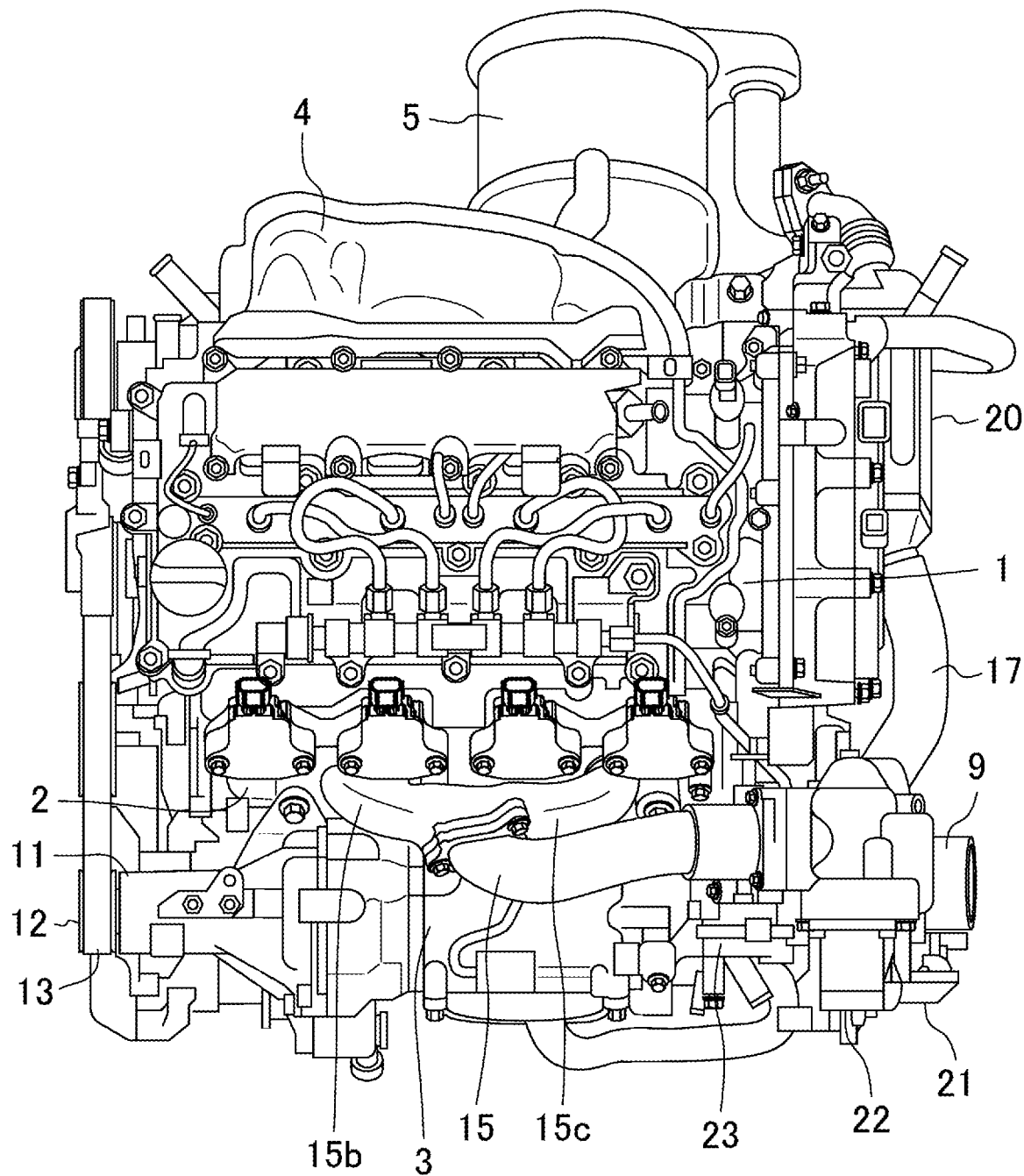
FIG. 2 is a plan view of the engine.

In FIG. 2, the reference character 1 denotes an engine body, the reference character 2 denotes a surge tank of an intake manifold, and the reference character 4 denotes an exhaust manifold. The exhaust gas purifier 5 includes an oxidation catalyst and a particulate filter. The engine according to this embodiment is a front intake rear exhaust transverse engine with a cylinder bank (i.e., the length of a crankshaft) extending in the transverse direction of the vehicle.

Figure 3:
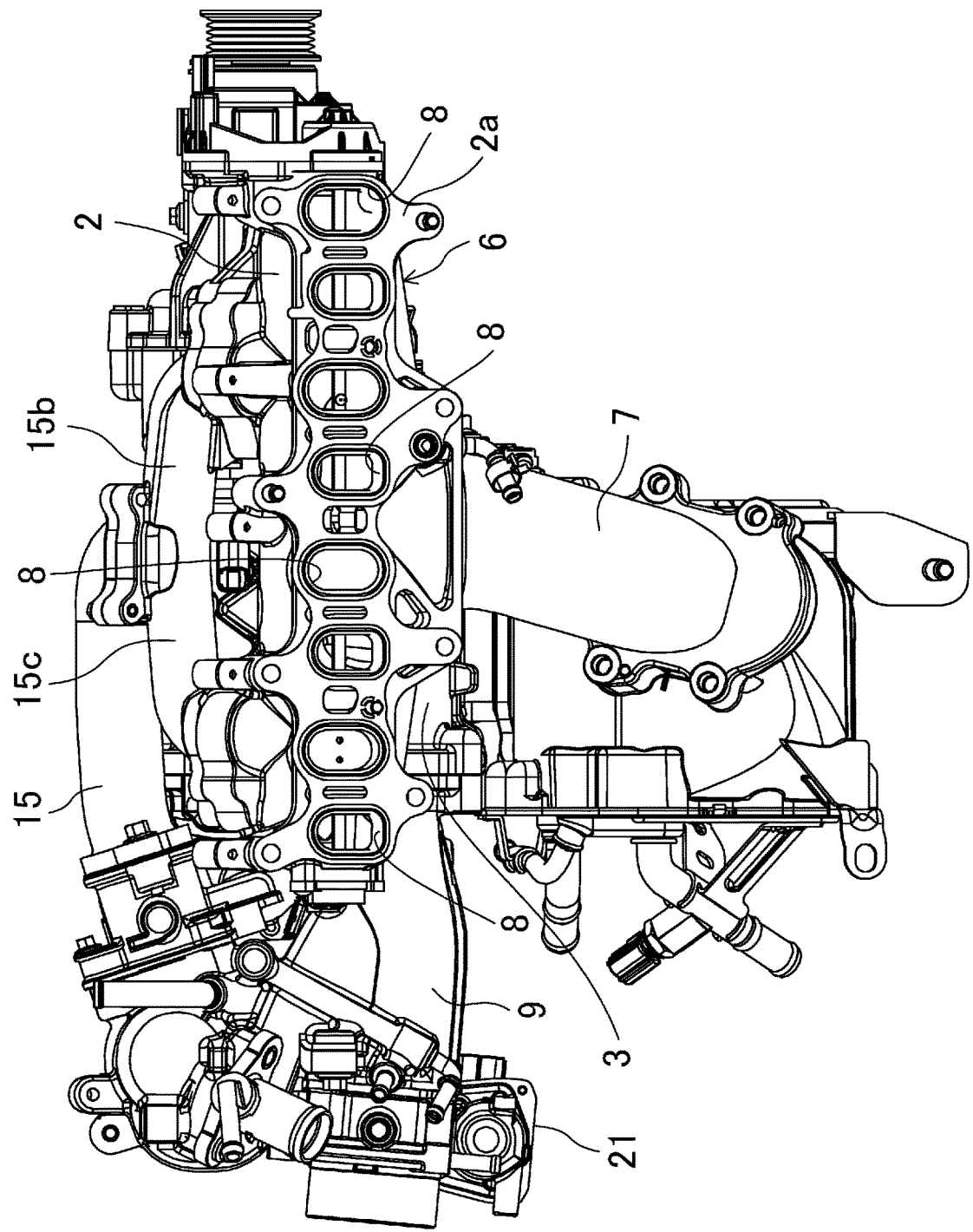
FIG. 3 is a rear view of an intake system of the engine.

The surge tank 2 extends along the cylinder bank at a side of the engine body 1 and is connected to intake ports of the cylinders of the engine. As shown in FIG. 3, the intake manifold 6 includes the surge tank 2 and an intake air introduction pipe 7 integral with the surge tank 2, and is made of metal (an aluminum alloy in this embodiment). The intake air introduction pipe 7 extends below the surge tank 2. FIG. 3 shows an intake system of the engine as viewed from the engine body.

The engine of this example is a four-cylinder engine including two intake ports for each cylinder. The intake manifold 6 includes, in total, eight branch intake passages 8 corresponding to the respective intake ports (i.e., two intake ports per cylinder). Each branch intake passage 8 extends from the surge tank 2. The intake manifold 6 is fixed to the engine body 1 at positions 2a around the branch intake passages 8 extending from the surge tank 2.

The supercharger 3 is a mechanical supercharger driven by an output shaft (crankshaft) of the engine serving as the supercharger driver S, and has a shaft extending along the cylinder bank at a side of a front of the surge tank 2 as shown in FIG. 2. The supercharger 3 is directly connected to an upstream intake pipe 9 extending along the cylinder bank. Intake air is introduced through the upstream intake pipe 9 into the supercharger 3. The upstream intake pipe 9 forms a portion 30a of the intake passage 30 upstream of the supercharger 3.

At the end of the supercharger 3 opposite to the upstream intake pipe 9, a clutch housing 11 for the supercharger 3 protrudes. This clutch housing 11 houses an electromagnetic clutch for driving the supercharger 3 using the output shaft of the engine. An input shaft of the electromagnetic clutch is coupled to a pulley 12, around which a transmission belt 13 is wound.

Figure 4:
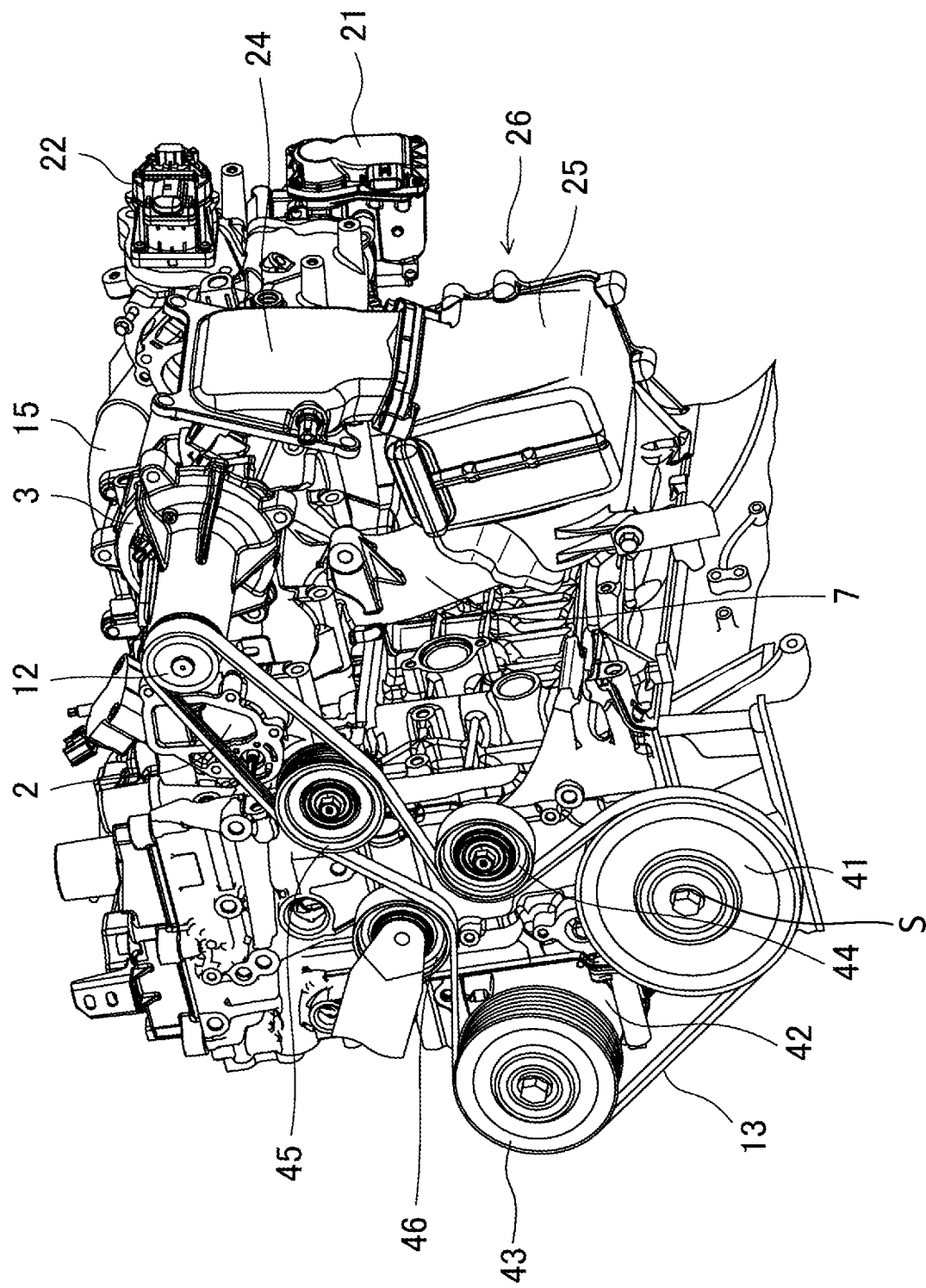
FIG. 4 is a perspective view of the engine.

As shown in FIG. 4, the transmission belt 13 is wound around a crank pulley 41 coupled to the output shaft of the engine serving as the supercharger driver S, the pulley 12 of the supercharger 3, and a pulley 43 coupled to a drive shaft of a water pump 42. Idlers 44 and 45 and a tension pulley 46 apply appropriate tensions to the transmission belt 13. The pulleys 12 and 43 of the supercharger 3 and the water pump 42 have appropriate winding angles.

A bypass pipe 15 forming the bypass passage 50 branches off from the upstream intake pipe 9 forming the portion 30a of the intake passage upstream of the supercharger 3.

Figure 5:
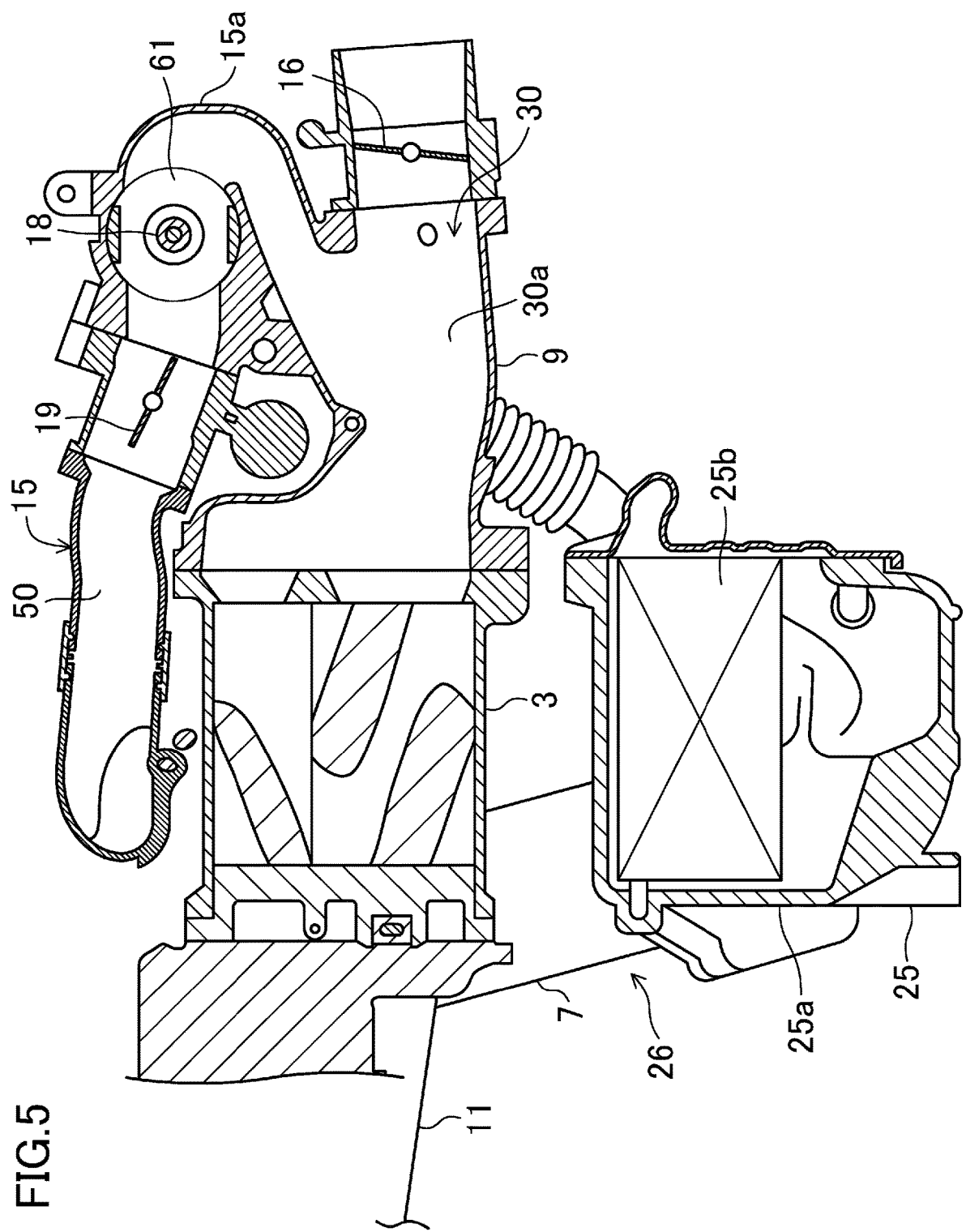
FIG. 5 is a longitudinal sectional view of the intake system of the engine.

As shown in FIG. 5, the bypass pipe 15 branches off from the upper surface of the upstream intake pipe 9 downstream of a throttle valve 16 disposed in the upstream intake pipe 9, and extends obliquely upward toward the upper side of the throttle valve 16. The bypass pipe 15 curves and turns back from its portion extending obliquely upward toward the upper side of the supercharger 3. Following the turn 15a, the bypass pipe 15 extends along the cylinder bank above the supercharger 3 toward the center of the surge tank 2.

Accordingly, as shown in FIGS. 2 and 3, the bypass pipe 15 branches off into a first branch pipe 15b extending to one end of the cylinder bank and a second branch pipe 15c extending to the other end of the cylinder bank, around the center of the surge tank 2. The first and second branch pipes 15b and 15c are connected to the surge tank 2 in positions corresponding to the two cylinders on one side and the two cylinders on the other side of the cylinder bank, respectively. The surge tank 2 forms the portion of the intake passage 30 downstream of the supercharger 3.

Downstream of the turn 15a of the bypass pipe 15, an EGR pipe 17 that recirculates exhaust gas from the exhaust system to the intake system is connected as shown in FIG. 2. The EGR pipe 17 guides the exhaust gas from a position downstream of the particulate filter of the exhaust gas purifier 5 to the intake system. The EGR pipe 17 includes, in an intermediate position, an EGR cooler 20 that cools the exhaust gas to be recirculated to the intake system.

As shown in FIG. 5, a portion of the bypass pipe 15 connected to the EGR pipe 17, i.e., the EGR gas introduction portion 61, is provided with an EGR valve 18 that controls the amount of the exhaust gas recirculated. A portion of the bypass pipe 15 downstream of the EGR valve 18 includes a bypass valve 19.

In FIG. 2, for example, the reference character 21 denotes a drive unit for the throttle valve 16, the reference character 22 denotes a drive unit for the EGR valve 18, and the reference character 23 denotes a drive unit for the bypass valve 19.

As shown in FIG. 4, an upstream end of a supercharging discharge pipe 24 for guiding the compressed intake air to the surge tank 2 is connected to a discharge port on a side surface of the supercharger 3 (opposite to the engine body). The supercharging discharge pipe 24 extends below the supercharger 3, and has a downstream end connected to the intercooler 25 located below the supercharger 3. The intercooler 25 is connected to the intake air introduction pipe 7 of the intake manifold 6. As shown in FIG. 5, the intercooler 25 includes a case 25a made of the same metal (i.e., the aluminum alloy) as the intake manifold 6, and a water cooler core 25b housed in the case.

In this embodiment, the supercharging discharge pipe 24, the intercooler 25, and the intake air introduction pipe 7 constitute a downstream intake pipe 26 that guides the intake air from the supercharger 3 to the surge tank 2. As shown in FIG. 4, the downstream intake pipe 26 is as a whole in a U-shape as viewed along the cylinder bank including the intercooler 25 at the bottom.

That is, the supercharger 3 is located above the intercooler 25. The supercharger 3 is interposed between the surge tank 2 and the supercharging discharge pipe 24. The lower part of the supercharger 3 is interposed between the intake air introduction pipe 7 and the supercharging discharge pipe 24, in other words, located inside the U-shape of the U-shaped downstream intake pipe 26.

The intake and exhaust systems of the engine are configured such that when the supercharger 3 is not driven, intake air flows from the portion 30a of the intake passage upstream of the supercharger 3 shown in FIG. 5 through the bypass passage 50 into the surge tank 2, and is sucked into the cylinder 10. When EGR gas is introduced into the bypass passage 50 from the EGR gas introduction portion 61, moisture contained in the EGR gas is cooled and condensed on the wall surface of the bypass passage 50 to form condensed water. The condensed water flows from the bypass passage 50 to the portion 30a of the intake passage, and tends to be accumulated at the bottom of the portion 30a. Further, when passing through the intercooler 25, the intake air is cooled to form the condensed water, which tends to be accumulated at the bottom of the cooler case 25a.

<Control of Supercharger and Bypass Valve>

Figure 6:
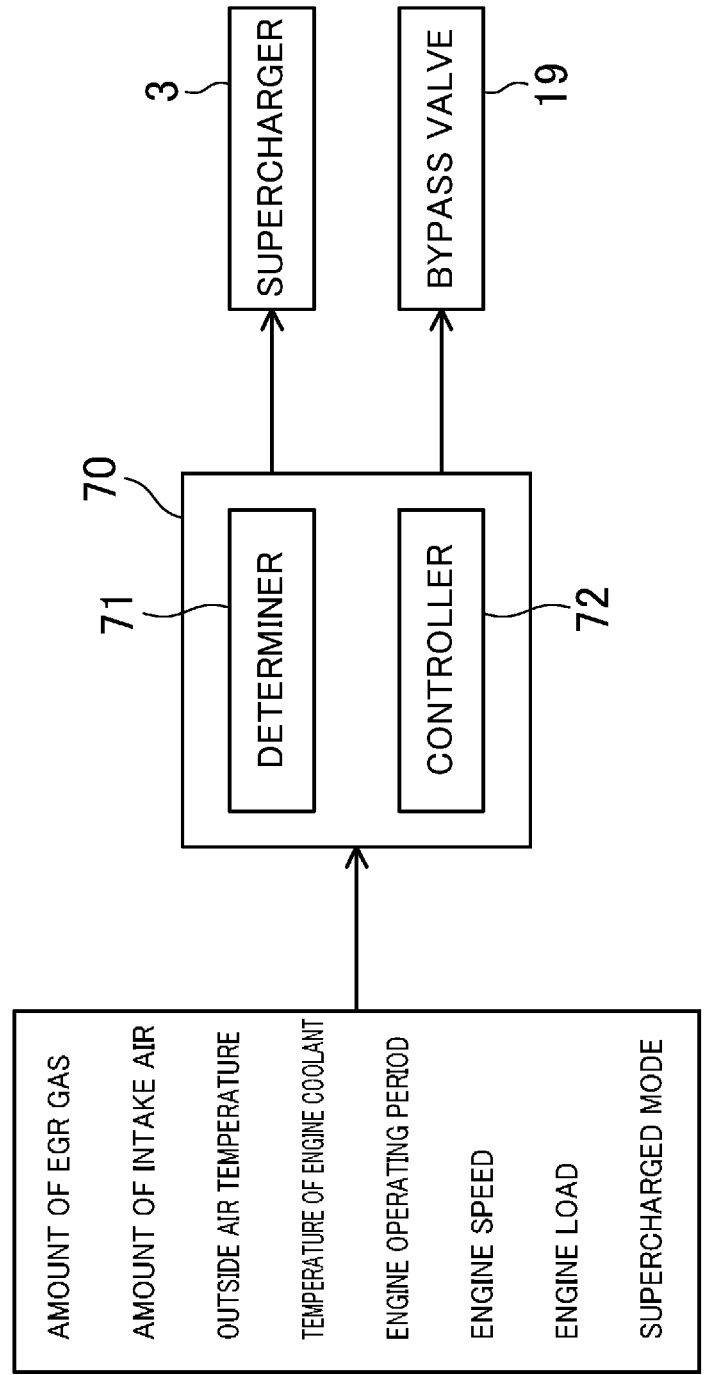
FIG. 6 is a block diagram showing a control system of the engine.

As shown in FIG. 6, the supercharger 3 and the bypass valve 19 are controlled by a power train control module (hereinafter, referred to as a "PCM") 70. The PCM 70 is comprised of a microprocessor having a CPU, a memory, a counter/timer group, an interface, and a path connecting these units together. The PCM 70 constitutes a control unit (and a controller).

The PCM 70 includes a determiner 71 and a controller 72. The determiner 71 determines whether or not the condition that the amount of condensed water remaining in the intake passage 30 has exceeded a predetermined upper limit has been met, based on input parameters associated with the amount. The controller 72 operates the supercharger 3 and the bypass valve 19 in a condensed water discharge mode, if, during the engine operation in the unsupercharged mode (in a naturally aspirated (NA) mode), the determiner 71 determines that the above condition has been met.

The determiner 71 receives, as the input parameters, information about the amount of EGR gas to be recirculated from the exhaust passage 40 to the intake passage 30, the flow rate of intake air to be sucked into the intake passage 30, the outside air temperature, the temperature of an engine coolant, the engine operating time, the engine speed, the engine load, and the engine operation in the supercharged mode (in the mode where intake air is supercharged by the supercharger 3).

The amount of the EGR gas is detected based on the opening of the EGR valve 18.

The flow rate of the intake air is detected by an airflow sensor provided in the upstream portion of the intake passage 30. The outside air temperature is detected by an outside air temperature sensor. The temperature of the engine coolant is detected by a temperature sensor provided in a coolant circulation path. The engine speed is detected by a crank angle sensor detecting the rotation angle of the crankshaft. The engine load is detected by an accelerator position sensor detecting the accelerator position corresponding to an operator input to an accelerator pedal of a motor vehicle.

The supercharged mode is set in correspondence with the engine speed and the engine load. In principle, the engine is set to operate in the supercharged mode under an intermediate load or a high load.

The determiner 71 calculates the amount A of condensed water produced in the intake passage 30 and the amount B of condensed water discharged from the intake passage 30 to the cylinder 10 in response to the driving of the supercharger 3, on a cycle-time basis, based on the amount of the EGR gas, the flow rate of the intake air, the outside air temperature, the temperature of the engine coolant, the engine operating time, the engine speed, and the engine load. Then, the determiner 71 calculates the difference between the amount A of the condensed water and the amount B of the condensed water discharged as the amount (A−B) of condensed water remaining in the intake passage 30, and integrates these values together. The determiner 71 thus determines whether or not the condition that the total value V of the amounts of the condensed water remaining has exceeded a predetermined upper limit Vo (V>Vo) has been met.

If a determination is made that during the engine operation in the unsupercharged mode, the condition (V>Vo) has been met, the controller 72 determines a discharge mode period T in accordance with the engine speed at this timing, makes the supercharger 3 perform the condensed water discharging operation only for the period T, and increases the opening of the bypass valve 19. The discharge mode period T is set to decrease as the engine speed increases.

Here, the bypass valve 19 has its opening reduced such that during the engine operation in the supercharged mode, the cross-sectional area of the bypass passage 50 is smaller than that obtained during the engine operation in the unsupercharged mode. On the other hand, when the supercharger 3 performs the condensed water discharge operation during the engine operation in the unsupercharged mode, the bypass valve 19 is operated such that the cross-sectional area of the bypass passage 50 is larger than that obtained during the engine operation in the unsupercharged mode.

Figure 7:
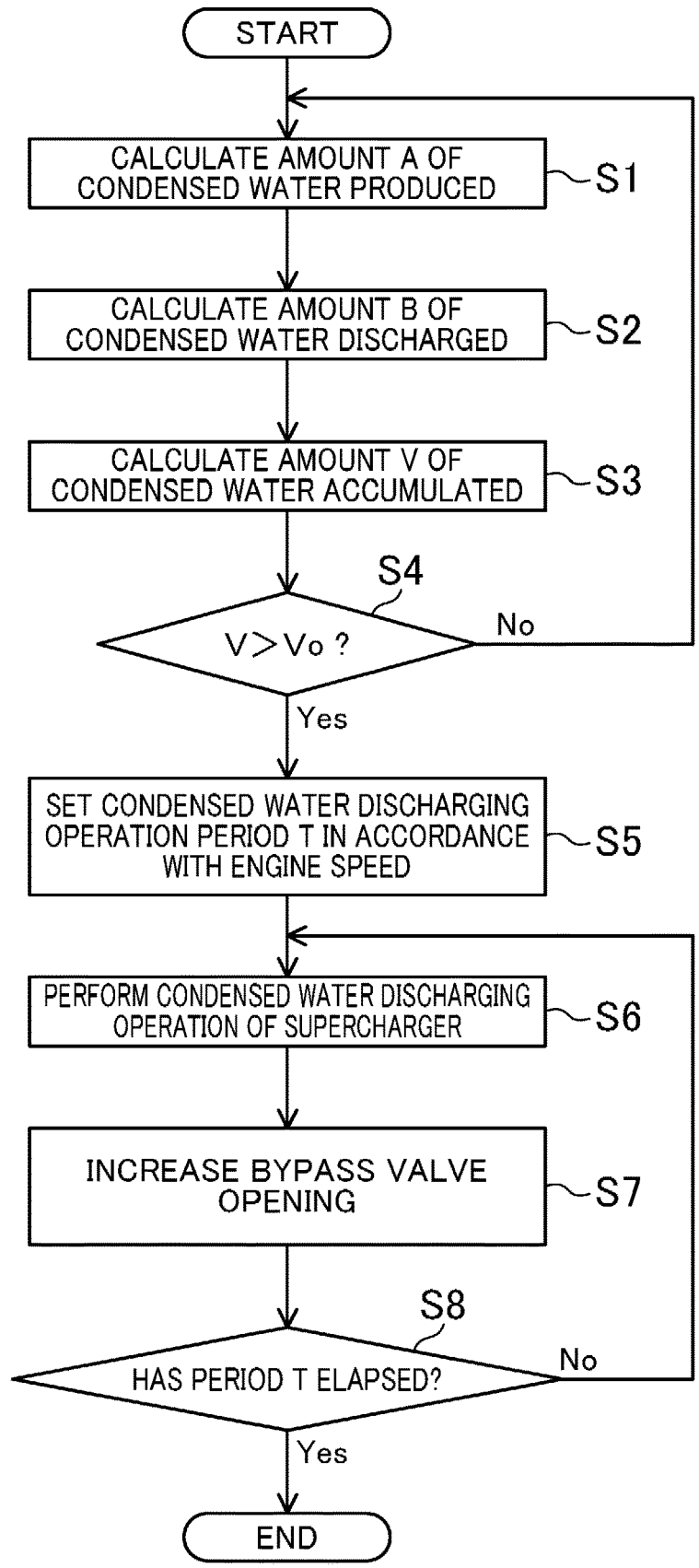
FIG. 7 is a flowchart showing the flow of control.

FIG. 7 shows the flow of the control. In Step S1 after the start, the amount A of condensed water produced in the intake passage 30 is calculated based on input parameters associated with the amount of condensed water remaining. In subsequent Step S2, based on the parameters, the amount B of condensed water discharged from the intake passage 30 to the cylinder 10 in response to the driving of the supercharger 3 is calculated. In the unsupercharged mode, the amount B of the condensed water discharged is zero.

In subsequent Step S3, the amount (A−B) of the condensed water remaining is calculated based on the amount A of the condensed water produced and the amount B of the condensed water discharged, and is integrated with the amount V of the condensed water remaining until the last cycle, thereby determining the amount V of the condensed water remaining until the present cycle. In subsequent Step S4, a determination is made whether or not the amount V of the condensed water remaining has exceeded the predetermined upper limit Vo. If V is less than or equal to Vo, the process returns to Step S1. If V is greater than Vo, the process proceeds to Step S5, and the discharge mode period T is determined in accordance with the engine speed at this timing. In subsequent Step S6, an electromagnetic clutch for a supercharger is turned on (connected to the supercharger 3) to drive the supercharger 3. In subsequent Step S7, the opening of the bypass valve 19 is changed such that the cross-sectional area of the bypass passage 50 increases. Then, until the period T has elapsed, the supercharger 3 performs the condensed water discharge operation, and the opening of the bypass valve 19 is changed (Step S8).

According to the control described above, as shown in the timing diagram in FIG. 8, while the engine is operating in the naturally aspirated (NA) mode, the amount V of the condensed water remaining gradually increases. Then, when the operating mode of the engine shifts to the supercharged mode, the electromagnetic clutch for the supercharger is turned on (connected to the supercharger 3) to drive the supercharger 3, and the bypass valve 19 is operated to reduce its opening. This increases the amount of intake air to be sucked into the cylinder 10, and reduces the amount of the intake air returned from the surge tank 2 through the bypass passage 50 to the portion 30*a* of the intake passage 30 upstream of the supercharger 3. The engine operation in the supercharged mode increases the engine torque.

In the engine operation in the supercharged mode, intake air is strongly sucked by the supercharger 3, and is discharged at high pressure from the supercharger 3. Thus, condensed water remaining in the intake passage 30 is discharged to the cylinder 10 together with the intake air. Specifically, condensed water remaining in the portion 30*a* of the intake passage 30 upstream of the supercharger 3 shown in FIG. 5 is sucked into the supercharger 3 together with intake air, and condensed water remaining at the bottom of the intercooler 25 is also pushed into the surge tank 2 together with intake air, and is thus sucked into the cylinder 10. Accordingly, as shown in FIG. 8, the amount V of the condensed water remaining decreases together with the driving of the supercharger 3. When the operation mode of the engine shifts from the supercharged mode to the naturally aspirated mode (the unsupercharged mode), the amount V of the condensed water remaining again increases in response to shutdown of the supercharger 3.

Thus, if the amount V of the condensed water remaining exceeds the predetermined upper limit Vo, the electromagnetic clutch for the supercharger is turned on (connected to the supercharger 3) even during the engine operation in the unsupercharged mode, and the supercharger 3 thus performs the condensed water discharge operation. At the same time, the bypass valve 19 is operated such that its opening is larger than that obtained while the engine operates in the naturally aspirated mode, i.e., such that the cross-sectional area of the bypass passage 50 is larger.

The condensed water discharge operation of the supercharger 3 allows condensed water remaining in the intake passage 30 (including condensed water remaining in the portion 30a of the intake passage 30 upstream of the supercharger 3 and condensed water remaining at the bottom of the intercooler 25) to be discharged to the cylinder 10 together with the intake air. As a result, as shown in FIG. 8, the amount V of the condensed water remaining decreases. This can reduce the risk that the amount V of the condensed water remaining may increase to an amount much larger than the upper limit Vo. In other words, it is possible to reduce the risk that the condensed water may cause metal components constituting the intake passage 30, such as the supercharger 3, the intercooler 25, and the valves, corrode, and to reduce the risk that water hammer may cause damage to the engine.

Further, an increase in the cross-sectional area of the bypass passage 50 triggers an increase in the amount of intake air returned from the surge tank 2 to the upstream side of the supercharger 3. As a result, even during the engine operation in the unsupercharged mode, it is possible to reduce the risk that the amount of intake air to be sucked into the cylinder 10 may increase. Accordingly, this can reduce the risk that the engine torque may increase to an unnecessary degree.

<Others>

The supercharger 3 of the foregoing embodiment is a mechanical supercharger driven by an output shaft of an engine. However, the supercharger 3 may be a mechanical supercharger driven by an electric motor or an exhaust turbine supercharger.

The invention claimed is:

1. An engine system comprising:
a supercharger provided in an intake passage of an engine;
a supercharger driver configured to drive the supercharger, the supercharger driver making the supercharger supercharge the engine while the engine operates in a predetermined supercharged mode; and
a power train control module including:
 a determiner storing executable instructions in non-transitory memory that, when executed, cause the determiner to determine whether or not a condition that an amount of condensed water remaining in the intake passage has exceeded a predetermined upper limit has been met, based on an input parameter associated with the amount; and
 a controller storing executable instructions in non-transitory memory that, when executed, cause the controller to operate the supercharger by the supercharger driver performing a condensed water discharging operation for discharging the amount of condensed water remaining in the intake passage to a cylinder of the engine during an engine operation in an unsupercharged mode having been determined by the determiner.

2. The engine system of claim 1, wherein
the intake passage includes a bypass passage, the bypass passage being configured to bypass the supercharger and connecting a portion of the intake passage upstream of the supercharger and a portion of the intake passage downstream of the supercharger together,
the bypass passage includes a bypass valve capable of changing a cross-sectional area of the bypass passage, and
the controller includes further executable instructions to control an operation of the bypass valve such that during the condensed water discharging operation of the supercharger, the cross-sectional area of the bypass passage is larger than while the condensed water discharging operation is not performed.

3. The engine system of claim 2, wherein
the supercharger is a mechanical supercharger rotationally driven by an output shaft of the engine serving as the supercharger driver, and
the controller further includes executable instructions to, as an engine speed during the condensed water discharging operation of the supercharger increases, shorten a period during which the condensed water discharging operation is performed.

4. The engine system of claim 2, further comprising
an EGR gas introduction portion configured to recirculate a portion of exhaust gas from the engine, as an EGR gas, to the intake passage,
the bypass passage branching upward from the portion of the intake passage upstream of the supercharger, and extending above the supercharger, and
the EGR gas introduction portion being provided as a portion of the bypass passage branching upward from the portion and extending above the supercharger.

5. The engine system of claim 1, wherein
the supercharger is a mechanical supercharger rotationally driven by an output shaft of the engine serving as the supercharger driver, and
as an engine speed during the condensed water discharging operation of the supercharger increases, the controller shortens a period during which the condensed water discharging operation is performed.

6. The engine system of claim 1, the device further comprising:
an intercooler configured to cool intake air discharged from the supercharger,
the intercooler being located below the supercharger.

7. An engine system comprising:
a supercharger provided in an intake passage of the engine;
a supercharger driver configured to drive the supercharger;
an intercooler configured to cool intake air discharged from the supercharger;
an EGR gas introduction portion configured to recirculate a portion of exhaust gas from the engine, as an EGR gas, to the intake passage,
the intake passage including a bypass passage, the bypass passage being configured to bypass the supercharger and connecting a portion of the intake passage upstream of the supercharger and a portion of the intake passage downstream of the supercharger together,
the supercharger driver making the supercharger supercharge the engine while the engine operates in a predetermined supercharged mode,
the bypass passage branching upward from the portion of the intake passage upstream of the supercharger, and extending above the supercharger,
the EGR gas introduction portion being provided as a portion of the bypass passage branching upward from the portion and extending above the supercharger,
the intercooler being located below the supercharger; and
a power train control module;
wherein the power train control module includes:
 a determiner storing executable instructions in non-transitory memory that, when executed, cause the determiner to determine whether or not a condition that an amount of condensed water remaining in the intake passage has exceeded a predetermined upper limit has been met, based on an input parameter associated with the amount; and a controller storing executable instructions in non-transitory memory that, when executed, cause the controller to operate the supercharger by the supercharger driver performing a condensed water discharging operation for discharging the amount of condensed water remaining in the intake passage to a cylinder of the engine during an engine operation in an unsupercharged mode having been determined by the determiner.

8. An engine system comprising:
an intake passage of an engine;
an exhaust passage;
a supercharger provided in the intake passage;
a supercharger driver configured to drive the supercharger, the supercharger driver making the supercharger supercharge the engine while the engine operates in a predetermined supercharged mode; and
a power train control module including:
  a determiner storing executable instructions in non-transitory memory that, when executed, cause the determiner to detect a condition that an amount of condensed water remaining in the intake passage has exceeded a predetermined upper limit has been met, based on an input parameter associated with the amount; and
  a controller storing executable instructions in non-transitory memory that, when executed, cause the controller to operate the supercharger by the supercharger driver performing a condensed water discharging operation of the supercharger for discharging the amount of the condensed water remaining to a cylinder of the engine through operation of the supercharger.

9. The engine system of claim 8, wherein
the intake passage includes a bypass passage, the bypass passage being configured to bypass the supercharger and connecting a portion of the intake passage upstream of the supercharger and a portion of the intake passage downstream of the supercharger together,
the bypass passage includes a bypass valve configured to change a cross-sectional area of the bypass passage, and
the controller further includes executable instructions to, during the condensed water discharging operation, control the bypass valve to vary the cross-sectional area of the bypass passage to be larger than while the condensed water discharging operation of the supercharger is not performed.

10. The engine system of claim 9, wherein
the supercharger is a mechanical supercharger driven by the engine serving as the supercharger driver, and
the controller further includes executable instructions to, during the condensed water discharging operation, as an engine speed increases, shorten a period during which the condensed water discharging operation is performed.

11. The engine system of claim 8, wherein
the supercharger is a mechanical supercharger driven by the engine serving as the supercharger driver, and
the controller further includes executable instructions to, during the condensed water discharging operation, as an engine speed increases, shorten a period during which the condensed water discharging operation is performed.

* * * * *